(12) United States Patent
Wang et al.

(10) Patent No.: US 11,673,366 B2
(45) Date of Patent: Jun. 13, 2023

(54) REINFORCED SANDWICH PANELS USING EXPANDABLE FOAM MATERIALS AND METHODS OF MAKING THE SAME

(71) Applicant: The Boeing Company, Chicago, IL (US)

(72) Inventors: Xiaoxi Wang, Mukilteo, WA (US); Gary E. Georgeson, Tacoma, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/370,334

(22) Filed: Jul. 8, 2021

(65) Prior Publication Data

US 2023/0011943 A1   Jan. 12, 2023

(51) Int. Cl.
| | |
|---|---|
| *B32B 5/18* | (2006.01) |
| *B32B 7/12* | (2006.01) |
| *B32B 15/04* | (2006.01) |
| *B32B 18/00* | (2006.01) |
| *B32B 27/06* | (2006.01) |
| *B64C 1/12* | (2006.01) |
| *B64D 45/02* | (2006.01) |

(52) U.S. Cl.
CPC ............... *B32B 5/18* (2013.01); *B32B 7/12* (2013.01); *B32B 15/046* (2013.01); *B32B 18/00* (2013.01); *B32B 27/065* (2013.01); *B32B 2250/40* (2013.01); *B32B 2307/202* (2013.01); *B32B 2307/302* (2013.01); *B32B 2605/18* (2013.01); *B64C 1/12* (2013.01); *B64D 45/02* (2013.01)

(58) Field of Classification Search
CPC ........... B32B 5/18; B32B 7/12; B32B 15/046; B32B 27/065; B32B 2250/40; B32B 2307/202; B32B 2307/302
See application file for complete search history.

(56) References Cited

U.S. PATENT DOCUMENTS

| | | | |
|---|---|---|---|
| 4,116,735 A * | 9/1978 | Plasse | B68G 11/06 264/46.7 |
| 8,992,709 B2 | 3/2015 | Saff et al. | |
| 9,527,261 B1 * | 12/2016 | Roper | B05D 1/60 |
| 2007/0256379 A1 | 11/2007 | Edwards | |
| 2009/0283635 A1 | 11/2009 | Gerken et al. | |
| 2010/0323181 A1 * | 12/2010 | Nutt | B29D 99/0021 428/221 |
| 2016/0183632 A1 * | 6/2016 | Scofield | A43B 13/187 36/28 |
| 2019/0293142 A1 * | 9/2019 | Giacomini | F16F 3/0876 |
| 2020/0039156 A1 | 2/2020 | Wang et al. | |
| 2020/0207033 A1 | 7/2020 | Wang et al. | |
| 2021/0001519 A1 | 1/2021 | Wang et al. | |
| 2021/0001571 A1 | 1/2021 | Santiago et al. | |
| 2021/0138734 A1 | 5/2021 | Maben et al. | |

OTHER PUBLICATIONS

Georgeson et al., "System and Method of Fabricating Sandwich Panels With a Foamable Material," U.S. Appl. No. 16/796,365.

* cited by examiner

*Primary Examiner* — Hai Vo

(74) *Attorney, Agent, or Firm* — MH2 Technology Law Group LLP

(57) ABSTRACT

A reinforced sandwich panel, including two skin panels; a foam core disposed between the two skin panels; and an expandable framework disposed within the foam core.

16 Claims, 9 Drawing Sheets

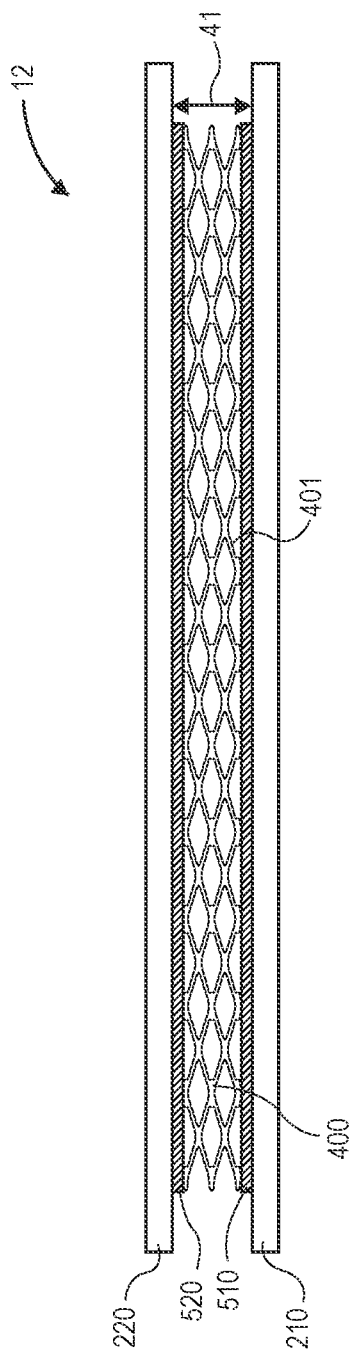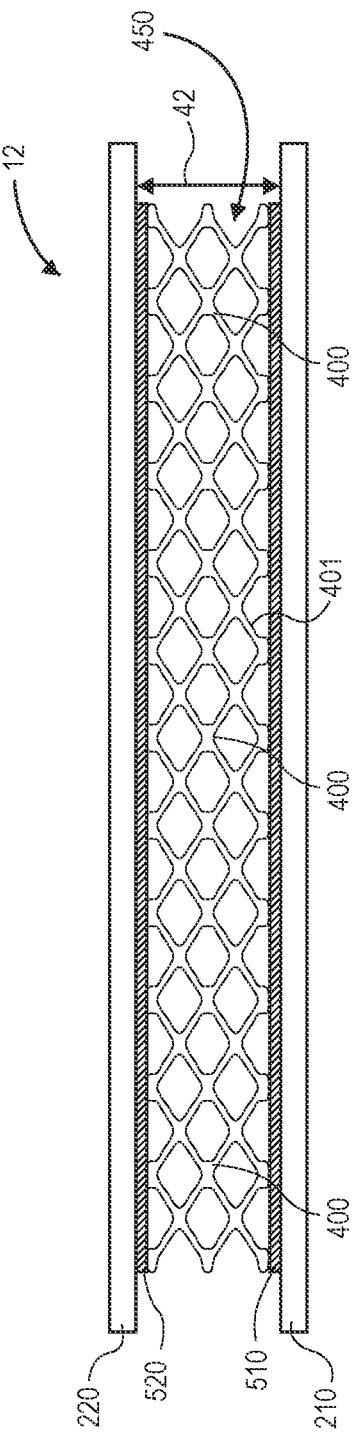

REINFORCED SANDWICH PANELS USING EXPANDABLE FOAM MATERIALS AND METHODS OF MAKING THE SAME

TECHNICAL FIELD

The present disclosure generally relates to sandwich panels, and more particularly, to reinforced sandwich panels using expandable foam materials and methods for making the same.

BACKGROUND

Sandwich panels, also referred to as composite sandwich panels, generally include a low-density core sandwiched between two face sheets of material. Sandwich panels have a high strength-to-weight ratio, which makes them useful in a variety of applications, such as aerospace.

However, there is a need for sandwich panels with enhanced structural support and variable core functionality, as well as sandwich panels that require no curing process or may be formed as an out-of-autoclave process and on site.

BRIEF SUMMARY

This summary is intended merely to introduce a simplified summary of some aspects of one or more implementations of the present disclosure. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities exemplified in the present disclosure may be achieved by providing a reinforced sandwich panel, including two skin panels; a foam core disposed between the two skin panels; and an expandable framework disposed within the foam core.

The reinforced sandwich panel can further include one or more adhesive layers, wherein the one or more adhesive layers bond at least one of the foam core and the expandable framework to the two skin panels.

The reinforced sandwich panel can further include a flexible film, wherein the foam core can be encapsulated by the flexible film, and wherein the flexible film can bond the foam core to at least one of the skin panels or the expandable framework.

The foam core can include one or more layers of expandable material and one or more additional layers, and wherein the one or more additional layers can include at least one of reinforcing fibers or adhesive layers.

The expandable framework can be bonded to the two skin panels, wherein the expandable framework can separate the skin panels a predetermined distance.

The expandable framework can resiliently expand from a collapsed state to an expanded state, and wherein the expandable framework can be biased toward the expanded state, wherein the expandable framework can include a plurality of interconnected and expandable struts configured to expand from the collapsed state to the expanded state, and wherein the plurality of interconnected and expandable struts can be configured to lock in at least one of the collapsed state and the expanded state.

The expandable framework can include one or more of a metal, a ceramic, a paper or fiber product, a thermoplastic material, a thermoset material, or combinations thereof.

The expandable framework can improve a thermal or electrical conductivity of at least one of the foam core or the reinforced sandwich panel.

The foregoing and/or other aspects and utilities exemplified in the present disclosure may also be achieved by providing a reinforced multiple-core sandwich panel, including two or more skin panels; and two or more cores disposed between the two or more skin panels; wherein at least one of the two or more cores can include a foam core having an expandable frameworks disposed within.

The reinforced multiple-core sandwich panel can further include one or more septum disposed between the two or more cores.

The reinforced multiple-core sandwich panel can further include one or more adhesive layers disposed between the two or more cores and the two or more skin panels or the one or more septum, wherein the one or more adhesive layers can bond at least one of the two or more cores to the two or more skin panels or the one or more septum.

At least one of the two or more cores can have a different functional characteristic than the rest of two or more cores.

The foregoing and/or other aspects and utilities exemplified in the present disclosure may also be achieved by providing a method for making a reinforced sandwich panel framework, including placing a first skin panel; placing an expandable framework on the first skin panel; placing a second skin panel on the expandable framework; and bonding the expandable framework to the first and second skin panels, wherein the expandable framework can have a first height separating the first and second skin panels when the expandable framework is in a collapsed state and a second height separating the first and second skin panels when the expandable framework is in an expanded state, and wherein the second height is greater than the first height.

The foregoing and/or other aspects and utilities exemplified in the present disclosure may also be achieved by providing a method for making a reinforced sandwich panel, including placing a reinforced sandwich panel framework; expanding the reinforced sandwich panel framework; placing a foam core within the reinforced sandwich panel framework; and expanding the foam core, wherein the reinforced sandwich panel framework can include two skin panels, and an expandable framework disposed between the two skin panels, and wherein the expandable framework can have a first height separating the skin panels when the expandable framework is in a collapsed state and a second height separating the skin panels when the expandable framework is in an expanded state, and wherein the second height is greater than the first height.

The method can further include at least one of consolidating a reinforced sandwich panel; trimming the reinforced sandwich panel; sealing the reinforced sandwich panel; and removing the reinforced sandwich panel, wherein placing a reinforced sandwich panel framework can include placing the reinforced sandwich panel framework at a location where the reinforced sandwich panel will be installed.

Expanding the reinforced sandwich panel framework can include using the expandable framework to resiliently expand the reinforced sandwich panel framework to the expanded state.

The expandable framework can lock in the expanded state to maintain a predetermined distance between skin panels of the reinforced sandwich panel framework.

Expanding the reinforced sandwich panel framework can include expanding the foam core to expand the reinforced sandwich panel framework to an expanded state, wherein an expandable material of the foam core can expand at room temperature, and wherein the expandable framework generates a static field capable of attracting the expandable material of the foam core.

Consolidating the reinforced sandwich panel can include placing a vacuum bag around the reinforced sandwich panel and applying a vacuum to the reinforced sandwich panel.

Consolidating the reinforced sandwich panel can include applying one of a curing pressure or temperature to the reinforced sandwich panel and fusion bonding at least one of the frameworks or the foam core to at least one of the skin panels.

Further areas of applicability will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures:

FIG. 4 illustrates a reinforced sandwich panel framework according to an implementation.

FIG. 5 illustrates a reinforced sandwich panel framework according to an implementation.

Figure 1:
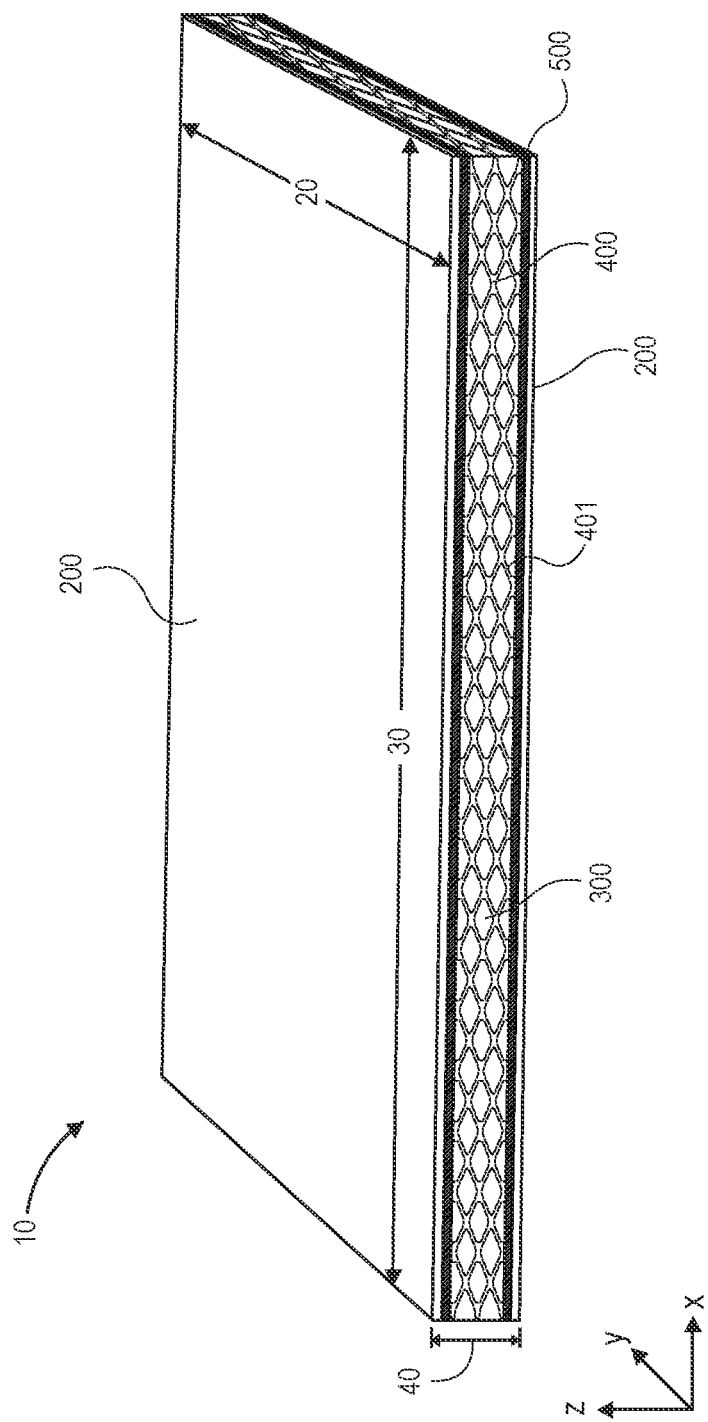
FIG. 1 illustrates a reinforced sandwich panel according to implementations of the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally, the same reference numbers will be used throughout the drawings to refer to the same or like parts.

Throughout the specification and claims, the following terms take the meanings explicitly associated herein, unless the context clearly dictates otherwise. Phrases, such as, "in an implementation," "in certain implementations," and "in some implementations" as used herein do not necessarily refer to the same implementation(s), though they may. Furthermore, the phrases "in another implementation" and "in some other implementations" as used herein do not necessarily refer to a different implementation, although they may. As described below, various implementations can be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described unless the context clearly dictates otherwise. In the specification, the recitation of "at least one of A, B, and C," includes implementations containing A, B, or C, multiple examples of A, B, or C, or combinations of A/B, A/C, B/C, A/B/B/BB/C, AB/C, etc. In addition, throughout the specification, the meaning of "a," "an," and "the" include plural references. The meaning of "in" includes "in" and "on." Similarly, implementations of the present disclosure may suitably comprise, consist of, or consist essentially of, the elements A, B, C, etc.

It will also be understood that, although the terms first, second, etc. can be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the disclosure. The first object, component, or step, and the second object, component, or step, are both, objects, component, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" can be construed to mean "when" or "upon" or "in response to determining" or "in response to detecting," depending on the context.

All physical properties that are defined hereinafter are measured at 20° to 25° Celsius unless otherwise specified.

When referring to any numerical range of values herein, such ranges are understood to include each and every number and/or fraction between the stated range minimum and maximum, as well as the endpoints. For example, a range of 0.5% to 6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect that the characteristic was intended to provide. As used herein, "about" is to mean within +/−10% of a stated target value, maximum, or minimum value.

Unless otherwise specified, all percentages and amounts expressed herein and elsewhere in the specification should be understood to refer to percentages by weight. The percentages and amounts given are based on the active weight of the material. For example, for an active ingredient provided as a solution, the amounts given are based on the amount of the active ingredient without the amount of solvent or may be determined by weight loss after evaporation of the solvent.

With regard to procedures, methods, techniques, and workflows that are in accordance with some implementations, some operations in the procedures, methods, techniques, and workflows disclosed herein can be combined and/or the order of some operations can be changed.

FIG. 1 illustrates a reinforced sandwich panel according to implementations of the present disclosure. As illustrated in FIG. 1, a reinforced sandwich panel 10 includes two skin panels 200, a foam core 300 disposed between the two skin panels 200, and an expandable framework 400 disposed within the foam core 300. The reinforced sandwich panel 10 can include one or more adhesive layers 500. The one or more adhesive layers 500 can bond at least one of the foam core 300 and the expandable framework 400 to the two skin panels 200.

As illustrated in FIG. 1, the reinforced sandwich panel 10 can have a width 20 along a y-axis, a length 30 along an x-axis, and a height 40 along a z-axis. The reinforced sandwich panel 10 can have an average height 40 from about 0.05 inches to about 5 inches. For example, the reinforced sandwich panel 10 can have an average height 40 from about 0.50 inches to about 4 inches, from about 0.50 inches to about 3 inches, or from about 0.50 inches to about 2 inches.

The skin panels 200 can be formed from materials having a high tensile and compression strength, such as metals (e.g., titanium, aluminum, steel, etc.), composite materials (e.g., carbon fiber reinforced polymer (CFRP), carbon fiber reinforced plastic (CRP), carbon fiber reinforced thermoplastic (CFRTP), etc.), fiberglass, ceramics, etc. For example, the skin panels 200 can include one or more of a metal, a ceramic, a thermoplastic material, a thermoset material, or combinations thereof. The skin panels 200 can include one or more of a thermoplastic material or a thermoset material. For example, the skin panels 200 can include one or more of phenolic, epoxy, polypropylene (PP), polyamide (PA), polyethylene terephthalate (PET), polyether ether ketone (PEEK), polyetherketoneketone (PEKK), polycarbonate (PC), polyetherimide (PEI), polyphenylsulfone (PPSU), thermoplastic polyurethane (TPU), acrylonitrile butadiene styrene (ABS), polyvinyl Chloride (PVC), polyurethane (PU), or combinations thereof. In some implementations, at least one of the skin panels 200 includes a metal, such as aluminum.

At least one of the skin panels 200 can be an uncured composite skin panel or pre-preg. Carbon fiber plies that have been impregnated with an uncured thermoset resin or a thermoplastic resin are often referred to as "pre-preg." As used herein, the term "pre-preg" refers to pre-impregnated composite plies, such as epoxy impregnated unidirectional composite tape or carbon fiber. A pre-preg may be flexible until it is cured, often by heat and pressure curing or curing within an autoclave. Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated. In other implementations, at least one of the skin panels 200 can be a cured composite skin panel.

The skin panels 200 can further comprise reinforcing fibers. The reinforcing fibers of the skin panels 200 can include one or more of carbon fibers, fiberglass fibers, aramid fibers, or combinations thereof.

While FIG. 1 illustrates skin panels 200 as generally flat, the present disclosure is not limited thereto. In some implementations, the skin panels 200 can have curved and/or highly contoured shape. The foam core 300 can also have a curved or highly contoured shape and/or can conform to a curved or highly contoured shape of the skin panels 200 as it expands. As used herein, the terms "highly contoured" refers to one or more curvatures with a radius of 100 inches or less along at least one of an x, y, or z axis. For example, highly contoured may include anything less than a 12-inch radius of curvature along at least one of an x, y, or z axis.

The foam core 300 can include an expandable or foamable material that begins in an unexpanded state, and expands, enlarges, swells, etc., in response to a predetermined change in condition or triggering event. For example, the foam core 300 can include expandable pellets, beads, powder, wet foams, etc., configured to expand in volume in response to a change in temperature, a change in pressure, a chemical reaction, and/or an input of radiative energy (such as, UV light exposure). The expandable material of the foam core 300 can be configured to expand at room temperature.

The foam core 300 can have an average height from about 0.05 inches to about 5 inches. For example, the foam core 300 can have an average height from about 0.50 inches to about 4 inches, from about 0.50 inches to about 3 inches, or from about 0.50 inches. The height of the foam core 300 can correspond to the predetermined distance as described below.

Figure 8:
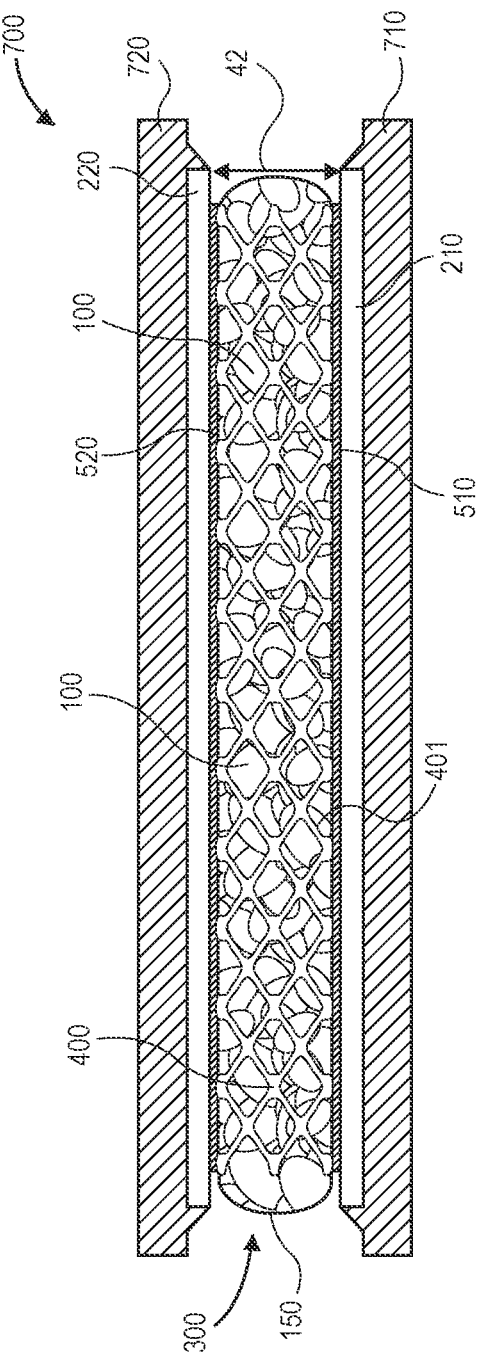
FIG. 8 illustrates an implementation of a method of making a reinforced sandwich panel.
Figure 9:
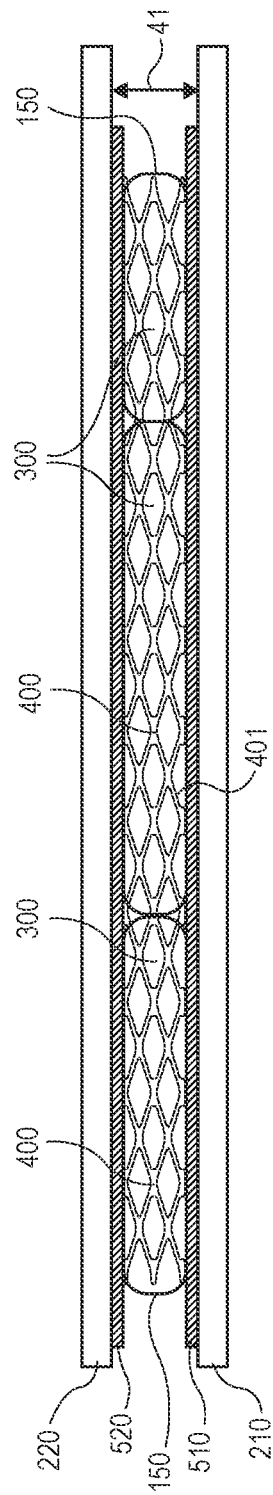
FIGS. 9-10 illustrate implementations of a method of making a reinforced sandwich panel.
Figure 10:
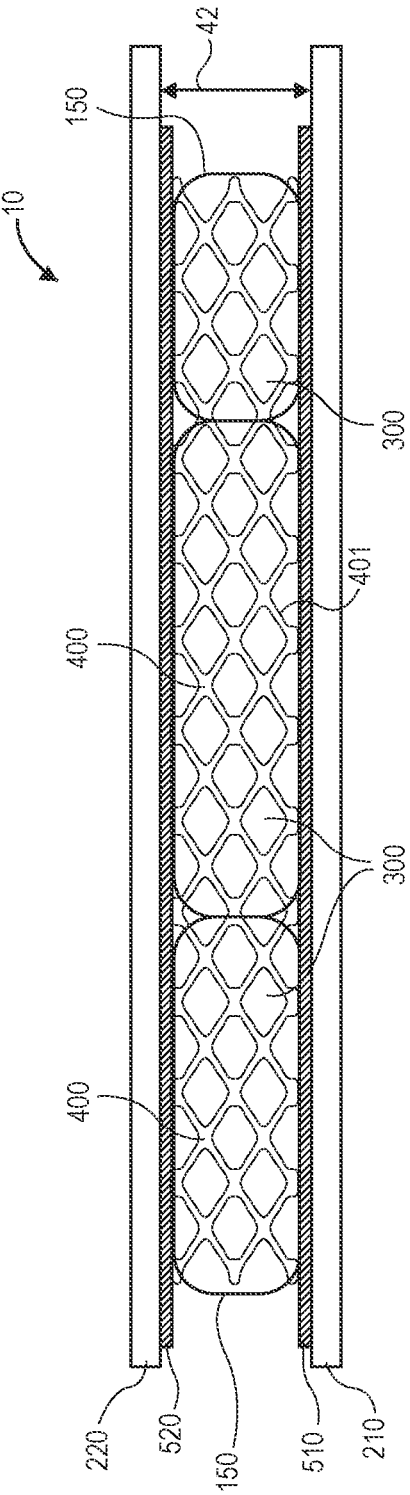

In some implementations, the reinforced sandwich panel 10 further comprises a flexible film 150. The flexible film 150 can be implemented as a pleated or expandable bag. As illustrated in FIGS. 8-10, the foam core 300 can be encapsulated by the flexible film 150. The flexible film 150 is configured to expand with an expansion of the expandable material of the foam core 300. The flexible film 150 can include one or more of polyolefins, polyester, polystyrene, polyvinyl chloride (PVC), polyvinyl fluoride (PVF), polyvinylidene difluoride (PVDF), PA, TPU, or combinations thereof. In some implementations, high strength films, such as PEEK and PEKK, are too rigid, cannot stretch sufficiently, and cannot be used in the flexible film 150. Accordingly, in some implementations, the flexible film does not include PEEK and PEKK.

The flexible film 150 can be configured to improve a thermal and/or electrical conductivity of the foam core 300 and/or the reinforced sandwich panel 10. For example, the flexible film 150 can include conductive materials to improve a thermal and/or electrical conductivity of the foam core 300 and/or the reinforced sandwich panel 10. For example, the flexible film 150 can enhance the electrical conductivity of the reinforced sandwich panel 10 to enhance an electromagnetic damage protection, such as protection against lightning strikes. By increasing an electrical conductivity of the reinforced sandwich panel 10, an electromagnetic effects (EME) resistance of an aircraft comprising one or more of the reinforced sandwich panel 10 is enhanced.

The flexible film 150 can include a thermoset film adhesive configured to cure according to an expansion of the expandable material of the foam core 300 and/or bond the foam core 300 to at least one of the skin panels 200 or the expandable framework 400. For example, the flexible film 150 can bond the foam core 300 to at least one of the skin panels 200 or the expandable framework 400. In some implementations, the flexible film 150 bonds the foam core 300 to the skin panels 200. The flexible film 150 can include a thermoplastic or thermoset material configured to melt or degrade according to an expansion of the expandable material of the foam core 300. For example, the flexible film 150 can degrade with an expansion of the expandable material such that the expandable material can expand around the expandable frameworks 400 and/or within substantially the entire fillable cavity 450. The flexible film 150 can be stitched in a certain pattern to enhance in-plane uniformity and help spread the expandable material uniformly. For example, the flexible film 150 can be stitched through the expandable material of the foam core 300.

As illustrated in FIGS. 9-10, the foam core 300 can include one or more foam cores 300. Each of the one or more foam cores 300 can be encapsulated by a separate flexible film 150. The one or more foam cores 300 can be arranged horizontally as illustrated in FIGS. 9-10 or can also be arranged vertically.

The foam core 300 can include a polymer matrix configured to hold a foaming agent. As illustrated in FIG. 8, the foam core 300 can be implemented as a plurality of expandable pellets 100 including a polymer matrix holding a foaming agent. As illustrated in FIG. 8, the expandable pellets 100 can be distributed uniformly between the skin panels 200 after expansion to form a consistent foam core 300.

The foaming agent, when heated to at least a predetermined temperature or in response to a predetermined change in condition or triggering event, can form a plurality of holes, pockets, or voids within the polymer matrix to increase its volume.

The polymer matrix can include one or more of a thermoplastic polymer, a thermoset polymer, an epoxy polymer, a silicone, a polyurethane, a rubber, or combinations thereof.

The polymer matrix can include phenolics, epoxies, polystyrene (PS), polyethylene (PE), polypropylene (PP), polyamide (PA), polyethylene terephthalate (PET), polyether ether ketone (PEEK), polyetherketoneketone (PEKK), polycarbonate (PC), polyetherimide (PEI), polyphenylsulfone (PPSU), thermoplastic polyurethane (TPU), acrylonitrile butadiene styrene (ABS), polyvinyl Chloride (PVC), polyurethane (PU), polyvinylidene fluoride (PVDF) or combinations thereof.

In some implementations, the polymer matrix includes high temperature thermoplastic polymers. In other implementations, the polymer matrix includes low temperature thermoplastic polymers. For example, the polymer matrix can include at least one of PET, PS, PEI, PU, PPSU, or combinations thereof. The polymer matrix can be at least one of PEI or PU.

The polymer matrix can be configured not to melt during a curing process. Accordingly, in some implementations, a melting point of the polymer matrix is higher than a maximum curing temperature, such as a curing temperature of the skin panels 200. For example, the polymer matrix may have a melting temperature of at least 150° F., of at least 200° F., of at least 300° F., or of at least 350° F. In other implementations, the polymer matrix may have a melting temperature from about 50° F. to about 850° F., from about 100° F. to about 600° F., or from about 200° F. to about 400° F. In some implementations, a melting point of the polymer matrix is lower than a melting point of the skin panels 200. Similarly, the melting point of the foam core 300 can be lower than a melting point of the skin panels 200.

The foam core 300 can be fusion bonded to the two skin panels 200. As used herein, the term "fusion boding" refers to the bonding substrates without any additional intermediate layers, such as an adhesive layer designed to bond substrates. For example, the skin panels 200 can include uncured composite skin panels or pre-pregs and the foam core 300 can be fusion bonded to the skin panels 200 during a curing of the uncured shin panels.

The foaming agent can include a gas or liquid configured to react in response to the predetermined change in condition or triggering event. The foaming agent may be a gas or liquid, such as carbon dioxide, nitrogen, one or more hydrocarbons, water, and/or any other suitable physical and/or chemical foaming agent configured to react in response to a predetermined change in condition or triggering event. In other implementations, the foaming agent can include a gas, a powder, a supercritical gas, and/or other components configured to react in response to a predetermined change in condition or triggering event. The foaming agent can include only one gas, one solid, or one liquid. The foaming agent can include combinations of gasses, solids, or liquids, or combinations of gasses, solids, and liquids. The foaming agent can include one or more of a physical foaming agent, a chemical foaming agent, or combinations thereof.

The foaming agent can include a physical foaming agent configured to expand according to a physical reaction, such as thermal expansion. The foaming agent can include one or more of chlorofluorocarbons (CFCs), hydrochlorofluorocarbons (HCFCs), hydrofluorocarbon (HFC), hydrocarbons, such as propane, isobutane, pentane, ethanol, water vapor, carbon dioxide ($CO_2$), nitrogen ($N_2$), helium, or combinations thereof.

The foaming agent can include a chemical foaming agent configured to create an expansion gas according to a chemical reaction. The foaming agent can include one or more of benzene sulfonyl hydrazide, toluenesulfonyl-semicarbaside, 5-Phenyltetrazole, dinitrozopentamethylentetraamin, sodium bicarbonate, citric acid, or combinations thereof. The foaming agent can include one or more of isocyanate, azodicarbonamide, hydrazine, toluenesulfonyl-semicarbaside, or combinations thereof.

In other implementations, the foam core 300 includes a wet foam configured to expand according to a chemical or physical reaction. For example, the foam core 300 can include wet forms of foamable material that can flow and fill the irregular shapes in a certain way, such as pastes, two-part liquid mixtures, etc., that activate to expand. The wet foam can be a multiple-part system configured for room-temperature activation. The wet foam can also be configured to activate in response to the predetermined change in condition or triggering event, such as a change in temperature, pressure, or chemical reaction.

For example, the foam core 300 can include a wet foam, and the wet foam can include a two-part system that is mixed together to activate foaming and expand at room temperature, such as a polyurethane foaming system.

The foam core 300 can include a polyurethane foaming system.

Figure 7:
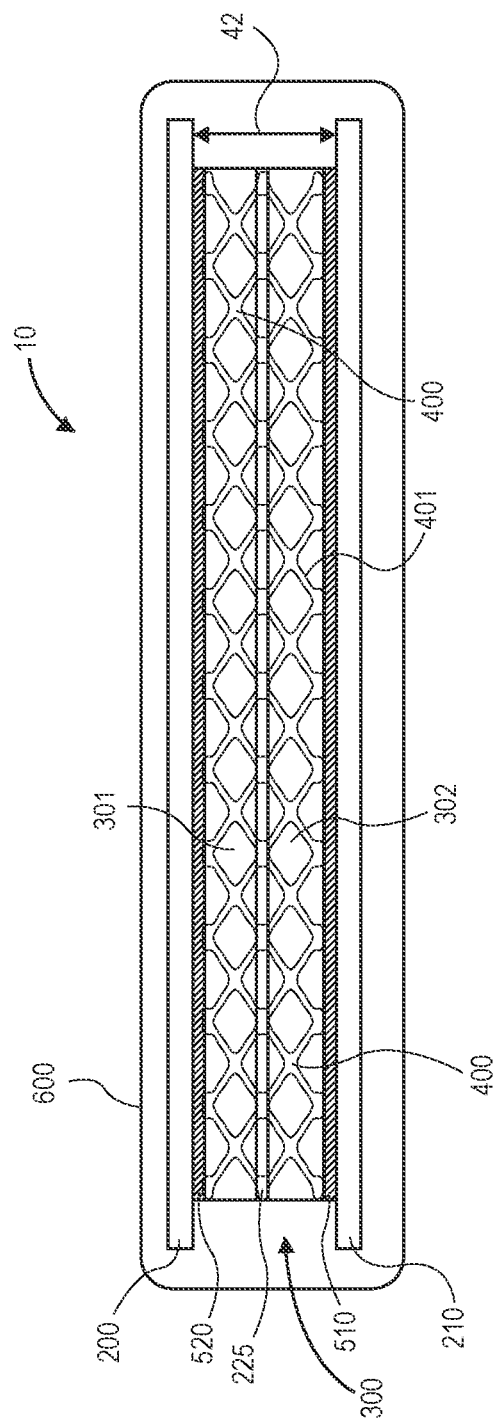
FIG. 7 illustrates an implementation of a method of making a reinforced sandwich panel.

The foam core 300 can include one or more layers of expandable material. The foam core 300 can include one or more additional layers 225. For example, as illustrated in FIG. 7, the foam core 300 can include two layers of expandable material 301 and 302. The one or more layers of expandable material 301 and 302 can include the same expandable material or can include different expandable materials. At least one of the one or more layers of expandable material 301 and 302 can be encapsulated by a flexible film 150.

An additional layer 225 can be disposed between the two layers of expandable material 301 and 302. The additional layer 225 can include at least one of reinforcing fibers or adhesive layers. For example, the additional layer 225 can be implemented as a fiber veil including reinforcing fibers configured to add structural strength to the foam core 300. The additional layer 225 can be implemented as an adhesive layer configured to bond the two layers of expandable material 301 and 302.

The foam core 300 can include reinforcing fibers. The reinforcing fibers can be used to increase the strength and stiffness of the foam core 300. The reinforcing fibers can include one or more of carbon fibers, fiberglass fibers, aramid fibers, polyester fibers, hemp fibers, wood fibers, or combinations thereof. Other fibers that can be used include talc fibers, wollastonite fibers, metal fibers, aromatic polyamide fibers, or combinations thereof. The reinforcing fibers can improve a thermal and/or electrical conductivity of the foam core 300.

The expandable framework 400 can include one or more expandable frameworks 400. The expandable framework 400 can be bonded to the skin panels 200. For example, the expandable framework 400 can be bonded to the skin panels 200 using adhesives, such as a thermoplastic film layer designed to bond the expandable framework 400 to the skin panels 200.

In one implementation, the reinforced sandwich panel 10 includes one or more adhesive layers 500 disposed between the skin panels 200 and the expandable framework 400. The one or more adhesive layers 500 can be configured to bond the expandable framework 400 to the skin panels 200. In another implementation, the expandable framework 400 can be fusion bonded to the skin panels 200. For example, the skin panels 200 can include uncured composite skin panels or pre-pregs and the expandable framework 400 can be fusion bonded to the skin panels 200 during a curing of the uncured shin panels. Fusion bonding allows uncured resin in uncured composite skins or pre-pregs to act as a bonding adhesive. Accordingly, fusion bonding of the skin panels 200 and the expandable framework 400 can occur at the same time of curing the skin panels 200 at high temperature. This can avoid using an additional layer of adhesive, lead to better bonding, and reduced release of volatile organic compounds (VOC).

The expandable framework 400 is configured to separate the skin panels 200 a predetermined distance. For example, as illustrated in FIGS. 4-5, the expandable framework has a first height 41 separating the skin panels 200 when the expandable framework 400 is in a collapsed state and a second height 42 separating the skin panels 200 when the expandable framework 400 is in an expanded state. The second height 42 is greater than the first height 41.

When the expandable framework 400 is in the expanded state, a fillable cavity 450 can be defined between the skin panels 200. The fillable cavity 450 can have a height corresponding to the predetermined distance. For example, the fillable cavity 450 can have a height corresponding to the second height 42. The expandable material of the foam core 300 can be disposed within the fillable cavity 450. The expandable framework 400 can be configured to maintain the skin panels 200 separated by the predetermined distance while the fillable cavity is filled with the expandable material.

The expandable framework 400 can maintain the second height 42 separating the skin panels 200 when the expandable framework 400 is in an expanded state when the reinforced sandwich panel 10 is subjected to a vacuum.

One desirable feature of the present disclosure is the ability to control the thickness of the foam core 300 by controlling the predetermined distance. As illustrated in FIG. 7, a distance between the skin panels 200 determines a thickness of the foam core 300. The second height 42 can correspond to a thickness of the foam core 300. For example, the distance between the skin panels 200 can constrain an expansion of the foam core 300 and/or determine the thickness of the foam core 300.

The expandable framework 400 can be resilient and/or flexible. For example, as illustrated in FIGS. 4-5, the expandable framework 400 can resiliently expand from a collapsed state having a first height 41 to an expanded state having a second height 42. In one implementation, the expandable framework 400 is biased toward the expanded state having a second height 42 in order to maintain the expandable framework 400 in the expanded state.

The expandable framework 400 can include a plurality of interconnected and expandable struts 401. For example, the expandable framework 400 can include a plurality of interconnected and expandable struts 401 configured to expand from a collapsed state having a first height 41 to an expanded state having a second height 42. In some implementations, the plurality of interconnected and expandable struts 401 are configured to lock in the expanded state in order to maintain the expandable framework 400 in the expanded state. In other implementations, the plurality of interconnected and expandable struts 401 are configured to lock in at least one of the collapsed state and the expanded state. A collapsed state can facilitate transportation by minimizing the size of the reinforced sandwich panel framework 12. An expanded state can facilitate installation by maintaining the expandable framework 400 in the expanded state during a filling operation.

The expandable framework 400 can be configured to attract the foam core 300. For example, the expandable framework 400 generates a static field capable of attracting the expandable material of the foam core 300. The expandable framework 400 can be configured to attract and/or capture an expandable material of the foam core 300, enhancing uniform distribution of the expandable material, especially in cases where the expandable material comprises small pellets and/or powder. A uniform distribution of the expandable material enhances uniform expansion of the expandable material and uniform formation of the foam core 300.

The plurality of interconnected and expandable struts 401 can generate a static field capable of attracting the expandable material of the foam core 300.

The expandable frameworks 400 can be configured not to create isolated pockets when in the expanded state. For example, the expandable frameworks 400 can have a structure designed to avoid areas that cannot be filled by the expandable material of the foam core 300 when it is expanded. Accordingly, the fillable cavity 450 can be in full liquid communication when the expandable framework 400 is in the expanded state.

The expandable framework 400 can include one or more of a metal, a ceramic, a paper or fiber product, a thermoplastic material, a thermoset material, or combinations thereof. For example, the expandable framework 400 can include one or more of phenolics, epoxy, polypropylene PP), polyamide (PA), polyethylene terephthalate (PET), polyether ether ketone (PEEK), polyetherketoneketone (PEKK), polycarbonate (PC), polyetherimide (PEI), polyphenylsulfone (PPSU), thermoplastic polyurethane (TPU), acrylonitrile butadiene styrene (ABS), polyvinyl Chloride (PVC), polyurethane (PU), or combinations thereof. The expandable framework 400 can include a paper or fiber product, such as Nomex.

The expandable framework 400 can have a higher melting temperature than a curing temperature of at least one of the skin panels 200. The expandable framework can have a higher melting temperature than at least one of a curing temperature of the foam core 300 or a melting temperature of the foam core 300. For example, the expandable framework 400 can act as a skeleton for the foam core 300, and a higher melting temperature ensures that an integrity of the expandable framework 400 is maintained during a curing process and neither the expandable framework 400 nor the foam core 300 collapses.

The expandable framework 400 can improve a thermal and/or electrical conductivity of at least one of the foam core 300 or the reinforced sandwich panel 10. For example, the expandable framework 400 can function as heat transfer and/or electrical pathways to enhance a thermal and/or electrical conductivity of the foam core 300. In certain implementations, the foam core 300 can be configured to have a low thermal and/or low electrical conductivity. For other implementations, such as when lightning can potentially occur, it is important to have such heat transfer and/or electrical pathways in the core matrix.

The one or more adhesive layers 500 can include an epoxy resin, an epoxy film, a paste, a glue, a plastic film, such as a polyethylene terephthalate or polyester (PET) film, a polyimide (PI) film, a polyphenylsulfone (PPSU) film, a polymethyl methacrylate (PMMA) film, or another type of material configured to bond substrates. The one or more adhesive layers 500 can bond at least one of the expandable framework 400 or the foam core 300 to the skin panels 200. The one or more adhesive layers 500 can bond the flexible film 150 to the skin panels 200.

Figure 2:
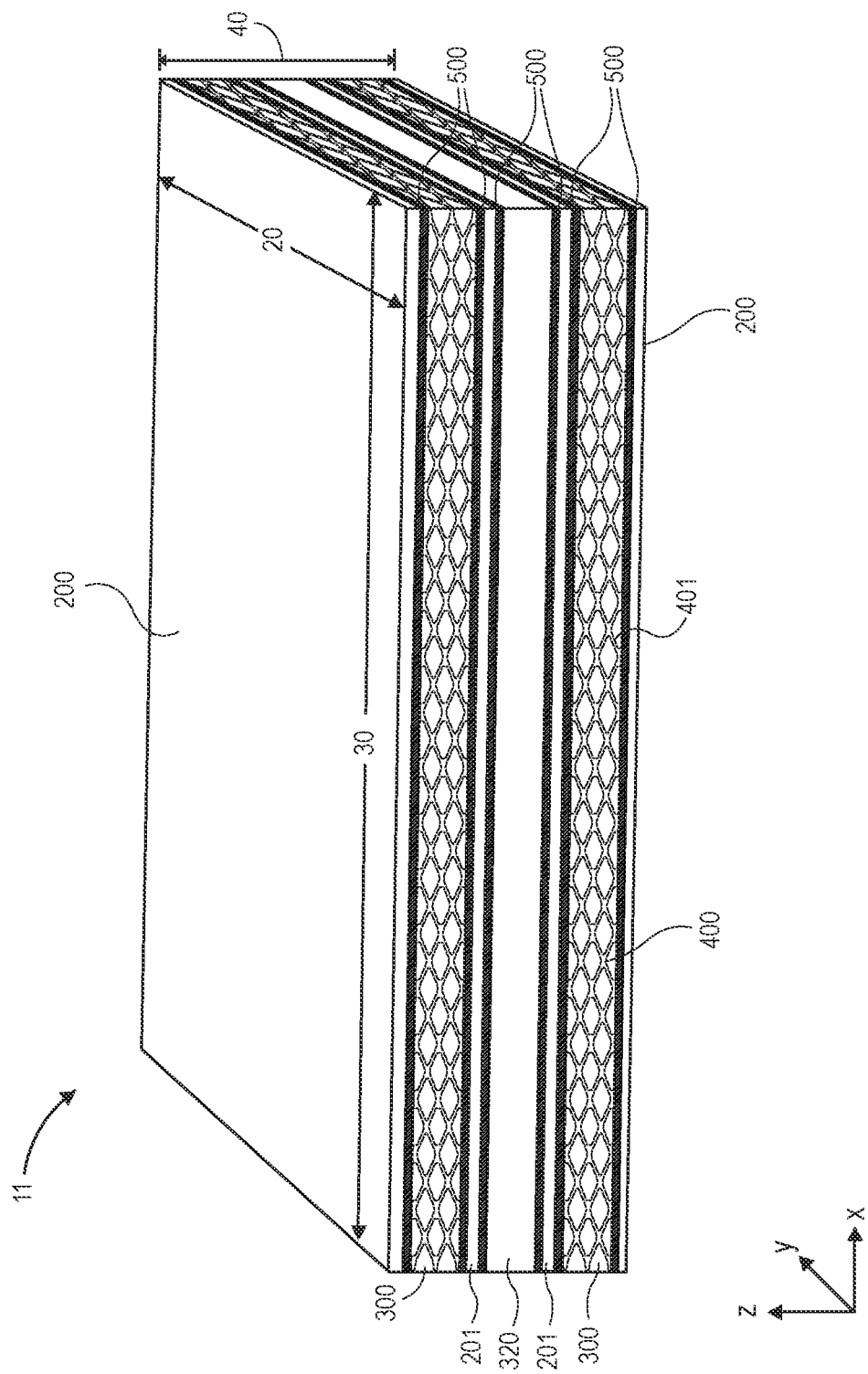
FIG. 2 illustrates a reinforced multiple-core sandwich panel according to implementations of the present disclosure.

FIG. 2 illustrates a reinforced multiple-core sandwich panel according to implementations of the present disclosure. FIG. 2 illustrates a reinforced multiple-core sandwich panel that, for instance, could use the foam core 300 and/or the expandable framework 400, as well as other components of the reinforced sandwich panel 10 described above and illustrated in FIG. 1. As such, the discussion below will reference various components as illustrated in FIG. 1.

As illustrated in FIG. 2, a reinforced multiple-core sandwich panel 11 can include two or more skin panels 200, and two or more foam cores 320 disposed between the two or more skin panels 200. Having two or more foam cores 320 allows the reinforced multiple-core sandwich panel 11 to achieve multiple functions simultaneously. For example, a first foam core 320 can comprise an open-cell flexible foam core layer to attenuate sound, and a second foam core 320 can comprise a close-cell rigid foam core to enhance fire retardance and overall strength and stiffness.

The two or more foam cores 320 can include known types of sandwich cores, such as honeycomb cores, solid foam cores, or machined foam cores. The two or more foam cores 320 can include a solid composite laminate. At least one of the two of more foam cores 320 can include a vacuum insulation layer. A vacuum insulation layer can significantly enhance thermal insulation and acoustic insulation performance of the foam core 320. The vacuum insulation layer can be formed by drawing a vacuum between two or more skin panels 200, by drawing a vacuum after an open-cell rigid foam core 320 has been form and then sealing it, or the vacuum insulation layer can comprise a premade vacuum panel forming a foam core 320.

The two or more foam cores 320 can include a foam core 300 as described above. At least one of the two or more foam cores 320 is a foam core 300 having an expandable frameworks 400 disposed within.

The foam core 300 can include one or more layers of expandable material, and the one or more layers of expandable material can be separated by one or more additional layers 225.

The two or more foam cores 320 can be separated by one or more intermediate skins or septum 201. For example, by separating more a rigid foam core 320 at the center of the reinforced multiple-core sandwich panel 11 from a more flexible foam core 320 at the edge of the reinforced multiple-core sandwich panel 11. The septum 201 can increase a rigidity, strength, or stiffness of the overall reinforced multiple-core sandwich panel 11. In some implementations, the septum 201 can provide attachment points for the foam cores 320.

Accordingly, each of the two or more foam cores 320 will be disposed between two skin panels 200, between a skin panel 200 and a septum 201, or between two septum 201. For example, as illustrated in FIG. 2, the reinforced multiple-core sandwich panel 11 can include one or more septum 201 disposed between the two or more foam cores 320. As illustrated in FIG. 2, a foam core 320 is disposed between two septum 201, and each of the foam cores 300 is disposed between one skin panel 200 and a septum 201. The septum 201 can include the same material as the two skin panels 200. In other implementations, the septum 201 can include one or more of fiber reinforced laminates, thermoset (epoxies, phenolics, etc.), thermoplastic solid sheets, thermoplastic foam sheets, or combinations thereof. Long fiber reinforced composite plies in septum 201 can provide stiffness or strength to the reinforced multiple-core sandwich panel 11, as could layering of sheets to form the septum 201. Septum 201 comprising foam or solid material with holes can provide a controlled flow barrier for separating the foam cores 320.

The reinforced multiple-core sandwich panel 11 can include one or more adhesive layers 500. The one or more adhesive layers 500 can be disposed between the two or more foam cores 320 and the two or more skin panels 200 or the one or more septum 201. The one or more adhesive layers 500 bond at least one of the two or more foam cores 320 to the two or more skin panels 200 or the one or more septum 201. For example, the one or more adhesive layers 500 can bond at least one of the foam core 300 and the expandable frameworks 400 to the two or more skin panels 200 or the one or more septum 201.

At least one of the foam core 300 and the expandable frameworks 400 is coupled to the at least one of the two or more skin panels 200. For example, the expandable framework 400 of the foam core 300 is bonded to the two or more skin panels 200 or the one or more septum 201 surrounding the foam core 300. In one implementation, at least one of the foam core 300 and the expandable frameworks 400 is fusion bonded to at least one of the two or more skin panels 200. For example, at least one of the foam core 300 and the expandable frameworks 400 is fusion bonded to at least one of the two or more skin panels 200 or the one or more septum 201 surrounding the foam core 300.

At least one of the two or more foam cores 320 can have one or more different functional characteristics than the rest of two or more foam cores 320. At least one of the two or more foam cores 320 can have one or more same functional characteristics than the rest of two or more foam cores 320. For example, a functional characteristic can include a fire-retardance, rigidity or stiffness, impact resistance, toughness, tensile strength, compression strength, and buckling resistance. The material or type of the foam cores 320 can determine one or more functional characteristics. For example, an expandable material of the foam core 300 can determine one or more functional characteristics of the foam core 300. In one implementations, the expandable material of at least one of the two or more foam cores 320 can be different than the expandable material of the rest of the two or more foam cores 320. For example, at least one of the two or more foam cores 320 can include one or more nanocellular foam layers to enhance a thermal insulation of the reinforced multiple-core sandwich panel 11. At least one of the two or more foam cores 320 can include one or more open-cell foam layers to enhance acoustic absorption properties of the reinforced multiple-core sandwich panel 11. At least one of the two or more foam cores 320 can include one or more rigid materials, such as PEKK or PEEK, to increase a stiffness of the reinforced multiple-core sandwich panel 11. At least one of the two or more foam cores 320 can include one or more flexible materials, such as TPU, to enhance a cushioning performance of the reinforced multiple-core sandwich panel 11.

Figure 3:
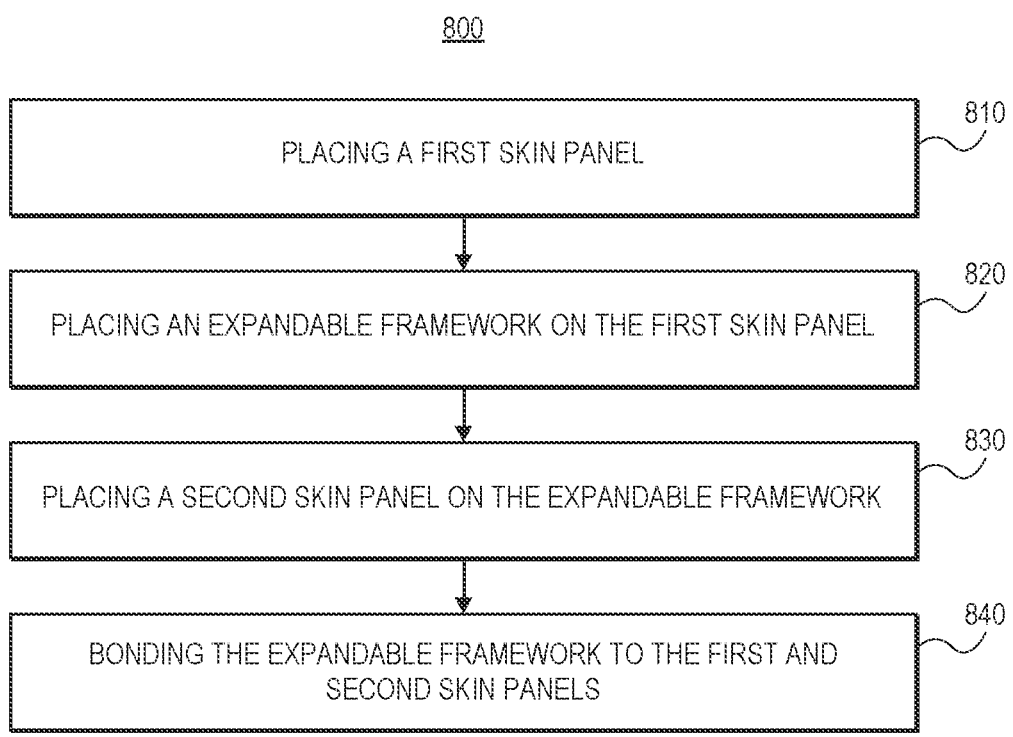
FIG. 3 illustrates a method of making a reinforced sandwich panel framework according to implementations of the present disclosure.

FIG. 3 illustrates a method of making a reinforced sandwich panel framework according to an implementation of the present disclosure. FIGS. 4-5 illustrate a reinforced sandwich panel framework according to implementations of the present disclosure. As illustrated in FIGS. 4-5, a reinforced sandwich panel framework 12 includes two skin panels 200 (210 and 220) and an expandable framework 400. The expandable framework 400 can include one or more expandable frameworks 400. As illustrated in FIGS. 4-5, the reinforced sandwich panel framework 12 can further include one or more adhesive layers 500 (510 and 520).

FIG. 3-5 illustrate a method that, for instance, could be used to make a reinforced sandwich panel framework 12 for the reinforced sandwich panel 10 or the reinforced multiple core sandwich panel 11 described above. As such, the discussion below will reference various components as illustrated in FIG. 1-5.

As illustrated in FIGS. 3-5, a method 800 for making a reinforced sandwich panel framework 12 begins with placing a first skin panel 210 in operation 810.

Operation 820 includes placing an expandable framework 400 on the first skin panel 210. In some implementations, the reinforced sandwich panel framework 12 includes a first adhesive layer 510. For example, the reinforced sandwich panel framework 12 can include a first adhesive layer 510 between the expandable framework 400 and the first skin panel 210. Accordingly, placing the expandable framework 400 on the first skin panel 210 can include placing a first adhesive layer 510 on the first skin panel 210 and placing the expandable framework 400 on the first adhesive layer 510. The first adhesive layer 510 can bond the expandable framework 400 to the first skin panel 210.

Operation 830 includes placing a second skin panel 220 on the expandable framework 400. In some implementations, the reinforced sandwich panel framework 12 includes a second adhesive layer 520. For example, the reinforced sandwich panel framework 12 can include a second adhesive layer 520 between the expandable framework 400 and the second skin panel 220. Accordingly, placing the second skin panel 220 on the expandable framework 400 can include placing a second adhesive layer 520 on the second skin panel 220 and placing the second skin panel 220 on the expandable framework 400. The second adhesive layer can bond the expandable framework 400 to the second skin panel 220.

Operation 840 includes bonding the expandable framework 400 to the first and second skin panels 210 and 220.

In some implementations, the reinforced sandwich panel framework 12 includes one or more adhesive layers 500 to bond the expandable framework 400 to the first and second skin panels 210 and 220, and operation 840 includes adhesively bonding the expandable framework 400 to the first and second skin panels 210 and 220. In other implementations, the first and second skin panels 210 and 220 include uncured composite skin panels or pre-pregs. Accordingly, bonding the expandable framework 400 to the first and second skin panels 210 and 220 can include curing the first and second skin panels 210 and 220 in operation 840. The curing of the first and second skin panels 210 and 220 can fusion bond the expandable framework 400 to the first and second skin panels 210 and 220.

As illustrated in FIG. 4-5, a reinforced sandwich panel framework 12 includes an expandable framework 400. The expandable framework 400 is bonded to the first and second skin panels 210 and 220. The expandable framework 400 is configured to separate the first and second skin panels 210 and 220 by a predetermined distance. The predetermined distance can correspond to a thickness of the foam core 300 after it is expanded. For example, as illustrated in FIGS. 4-5, the expandable framework separates the first and second skin panels 210 and 220 by a first height 41 when the expandable framework 400 is in a collapsed state and by a second height 42 when the expandable framework 400 is in an expanded state. The second height 42 can correspond to the predetermined distance.

In some examples, the reinforced sandwich panel framework 12 can hold the foam core 300 in the collapsed state before the foam core 300 is fully expanded. For example, as illustrated in FIG. 9, one or more foam cores 300 can be placed within the reinforced sandwich panel framework 12 in a collapsed state having a first height 41 before the foam cores 300 are expanded.

As illustrated in FIG. 5, when the expandable framework 400 is in the expanded state, the reinforced sandwich panel framework 12 defines a fillable cavity 450 between the first and second skin panels 210 and 220. The fillable cavity 450 can be configured to receive the foam core 300. The expandable framework 400 can be configured to maintain the first and second skin panels 210 and 220 separated by the predetermined distance when the fillable cavity is filled. The predetermined distance can correspond to the final thickness of the foam core 300 after it is expanded.

Figure 6:
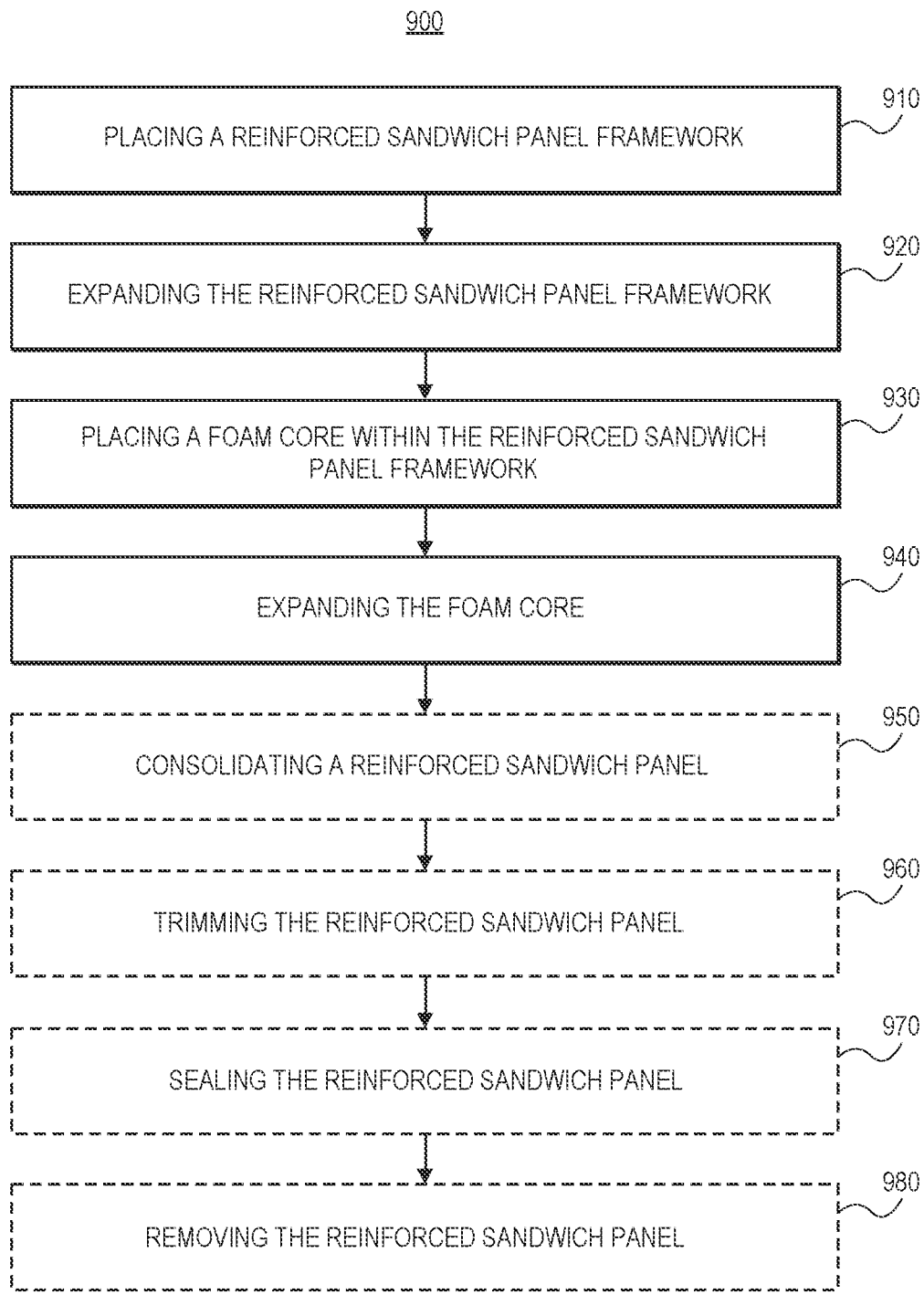
FIG. 6 illustrates a method of making a reinforced sandwich panel according to implementations of the present disclosure.

FIG. 6 illustrates a method of making a reinforced sandwich panel according to an implementation of the present disclosure. FIGS. 7-10 illustrate implementations of a method of making a reinforced sandwich panel. FIG. 6 illustrates a method that, for instance, could be used to make the reinforced sandwich panel 10 or the reinforced multiple core sandwich panel 11 using the reinforced sandwich panel framework 12 described above. As such, the discussion below will reference various components as illustrated in FIG. 1-10.

As illustrated in FIG. 6, a method 900 of making a reinforced sandwich panel 10 begins with placing a reinforced sandwich panel framework 12 in operation 910. Placing a reinforced sandwich panel framework 12 can include placing the reinforced sandwich panel framework 12 at a location where the reinforced sandwich panel 10 will be installed. For example, the reinforced sandwich panel 10 can be placed at a final position where the reinforced sandwich panel 10 is to be ultimately installed.

In method 900, the reinforced sandwich panel 10 can be created on site. For example, the foam core 300 can be installed and expanded within the reinforced sandwich panel framework 12 at the place or position where the reinforced sandwich panel 10 will be ultimately placed. This eliminates additional process steps of manufacturing the foam core 300 separately from the reinforced sandwich panel framework 12. In addition, because the reinforced sandwich panel framework 12 can be transported in a collapsed state, method 900 eliminates the logistics and transportation costs of transporting completed reinforced sandwich panels 10 already including an expanded foam core 300.

Another feature of method 900 is that the expandable material of the foam core 300 can be foamable. That is, they can occupy less space or volume before expansion, facilitating transportation and storage of the reinforced sandwich panel 10 and/or the reinforced sandwich panel framework 12. For example, before expansion or foaming, the expandable material of the foam core 300 can be 1 mm thick and after expansion it can be 10 mm thick, saving a lot of space for transportation and storage, especially when combined with an expandable framework 400.

In another implementation, placing a reinforced sandwich panel framework 12 can include placing the reinforced sandwich panel framework 12 within a forming tool 700. As illustrated in FIG. 8, the forming tool 700 can be configured to hold the reinforced sandwich panel framework 12 during installation and expansion of the foam core 300. For example, a first tool member 710 can be configured to hold a first skin panel 210 and a second tool member 720 can be configured to hold a second skin panel 220.

Operation 920 includes expanding the reinforced sandwich panel framework 12. Expanding the reinforced sandwich panel framework 12 can include expanding the reinforced sandwich panel framework 12 to separate the first and second skin panels 210 and 220 to a predetermined distance, such as a second height 42. The second height 42 can correspond to a thickness of the foam core 300.

As illustrated in FIG. 4-5, the expandable framework 400 can be resilient and/or flexible, and the expandable framework 400 can resiliently expand the reinforced sandwich panel framework 12 from a collapsed state having a first height 41 to an expanded state having a second height 42. Accordingly, expanding the reinforced sandwich panel framework 12 can include using the expandable framework 400 to resiliently expand the reinforced sandwich panel framework 12 to an expanded state. In one implementation, the reinforced sandwich panel framework 12 expands to the expanded state solely due to a resilient force of the expandable framework 400. For example, the reinforced sandwich panel framework 12 can expand to the expanded state without an external force. The expandable framework 400 can be configured to lock in an expanded state to maintain the predetermined distance between the first and second skin panels 200. In one implementation, the expandable framework 400 locks in the expanded state to maintain a predetermined distance between skin panels 200 of the reinforced sandwich panel framework 12.

In another implementation, the reinforced sandwich panel framework 12 can be expanded into the expanded state through external forces. For example, as illustrated in FIG. 8, the reinforced sandwich panel framework 12 can be placed within a forming tool 700, and the forming tool 700 can be used to expand the reinforced sandwich panel framework 12 to the predetermined distance between the first and second skin panels 200. In one implementation, the first tool member 710 is a first forming tool, the second tool member 720 is a second forming tool and the first tool member 710 and second tool member 720 are configured to hold the first and second skin panels 210 and 220, and at least one of the first tool member 710 and the second tool member 720 is configured to move to separate the first and second skin panels 210 and 220 to the predetermined distance. Accordingly, expanding the reinforced sandwich panel framework 12 can include using the forming tool 700 to expand the reinforced sandwich panel framework 12 to an expanded state.

In yet another implementation, as described below, the reinforced sandwich panel framework 12 can be expanded into the expanded state by the expansion of the foam core 300. Accordingly, expanding the reinforced sandwich panel framework 12 can include expanding the foam core 300 to expand the reinforced sandwich panel framework 12 to an expanded state.

Operation 930 includes placing a foam core 300 within the reinforced sandwich panel framework 12. For example, as illustrated in FIGS. 4-5, a fillable cavity 450 is defined between the first and second skin panels 210 and 220 when the reinforced sandwich panel framework 12 is in the expanded state. Placing a foam core 300 within the reinforced sandwich panel framework 12 can include placing a foam core 300 within a fillable cavity 450 of the reinforced sandwich panel framework 12. The foam core 300 can be encapsulated by a flexible film 150.

As illustrated in FIG. 9, in other implementations, placing a foam core 300 within the reinforced sandwich panel framework 12 can include placing a foam core 300 within the reinforced sandwich panel framework 12 when it is in the collapsed state. As described above, placing an unexpanded foam core 300 within the reinforced sandwich panel framework 12 can facilitate its transportation to an installation site.

As illustrated in FIG. 7, the foam core 300 can include one or more layers of expandable material. For example, the foam core 300 can include two layers of expandable material 301 and 302 separated by an additional layer 225.

As illustrated in FIG. 8, the foam core 300 can include a plurality of expandable pellets 100 encapsulated by a flexible film 150.

As illustrated in FIGS. 9-10, the foam core 300 can include one or more foam cores 300. Each of the one or more foam cores 300 can be encapsulated by a flexible film 150.

In some implementations, the reinforced sandwich panel framework 12 includes one or more adhesive layers 500, and the foam core 300 can be placed on the one or more adhesive layers 500. For example, as illustrated in FIG. 9, the one or more foam cores 300 can be placed on at least one of a first adhesive layer 510 or a second adhesive layer 520. The first and second adhesive layers 510 and 520 can hold the one or more foam cores 300 within the reinforced sandwich panel framework 12 before an expansion of the one or more foam cores 300. For example, the first and second adhesive layers 510 and 520 can hold the one or more foam cores 300 during a transportation of the reinforced sandwich panel framework 12.

Operation 940 includes expanding the foam core 300. As described above, an expandable material of the foam core 300 can expand in response to a predetermined change in condition or triggering event. In some implementations, the expandable material of the foam core 300 is configured to expand at room temperature. Accordingly, expanding the foam core 300 can include activating an expandable material of the foam core 300. The foam core 300 can expand until it reaches a thickness corresponding to the predetermined distance. For example, as illustrated in FIGS. 9-10, the foam cores 300 expand until reaching a height 42. As illustrated in FIGS. 9-10, in some implementations, an expansion of the foam core 300 can expand the reinforced sandwich panel framework 12 to the expanded state. The expandable framework 400 can be configured to prevent expansion of the foam core 300 beyond the second height 42 and/or the predetermined distance. The foam core 300 can expand to fill substantially all of the fillable cavity 450.

Method 900 can further include consolidating a reinforced sandwich panel 10 in operation 950. For example, after the foam core 300 is expanded, the reinforced sandwich panel framework 12 can form a reinforced sandwich panel 10. As illustrated in FIG. 7, consolidating the reinforced sandwich panel 10 can include placing a vacuum bag 600 around the reinforced sandwich panel 10 and applying a vacuum to the reinforced sandwich panel 10.

At least one of the skin panels 200 (210 or 220) can include uncured composite skin panels or pre-pregs and consolidating the reinforced sandwich panel 10 can include applying one of a curing pressure or temperature to the reinforced sandwich panel 10. In some implementations, curing of the skin panels 200 can be used to fusion bond at least one of the expandable frameworks 400 or the foam core 300 to at least one of the skin panels 200 (210 or 220).

Method 900 can further include trimming the reinforced sandwich panel 10 in operation 960. For example, excess expandable material of the foam core 300 can be trimmed if it protrudes from between the first and second skin panels 210 and 220. Trimming the reinforced sandwich panel 10 can include cutting the reinforced sandwich panel 10 to a desired shape and/or size.

Method 900 can further include sealing the reinforced sandwich panel 10 in operation 970. For example, the reinforced sandwich panel 10 can be coated with a resin coat 630 (not illustrated). Sealing the reinforced sandwich panel 10 can include edge sealing the reinforced sandwich panel 10. For example, a sealant, such as an epoxy resin, can be applied to edges of the reinforced sandwich panel 10.

Method 900 can further include removing the reinforced sandwich panel 10 in operation 980. For example, after expanding the foam core 300, the reinforced sandwich panel 10 can be removed from the forming tool 700 illustrated in FIG. 8. In some implementations, removing the reinforced sandwich panel 10 includes cooling the reinforced sandwich panel 10 before removal. Removing the reinforced sandwich panel 10 can include known techniques, such as applying a mold release agent and/or cooling at a certain rate, to ensure that the reinforced sandwich panel 10 does not stick to the forming tool 700 and/or is easy to remove.

Figure 11:
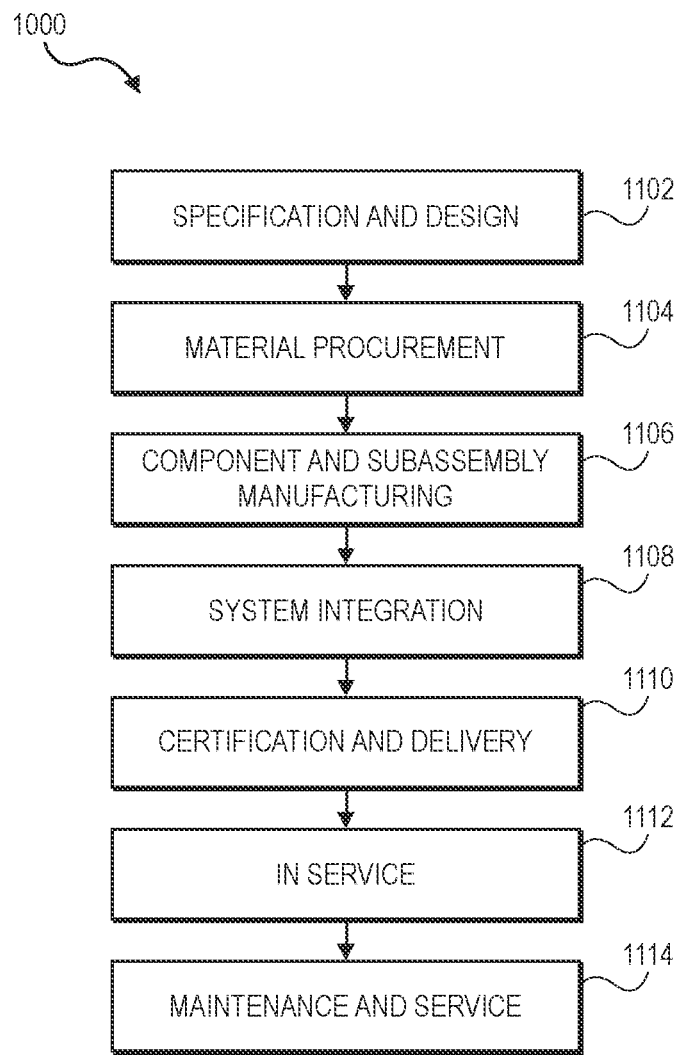
FIG. 11 illustrates a flow diagram of aircraft production and service methodology.
Figure 12:
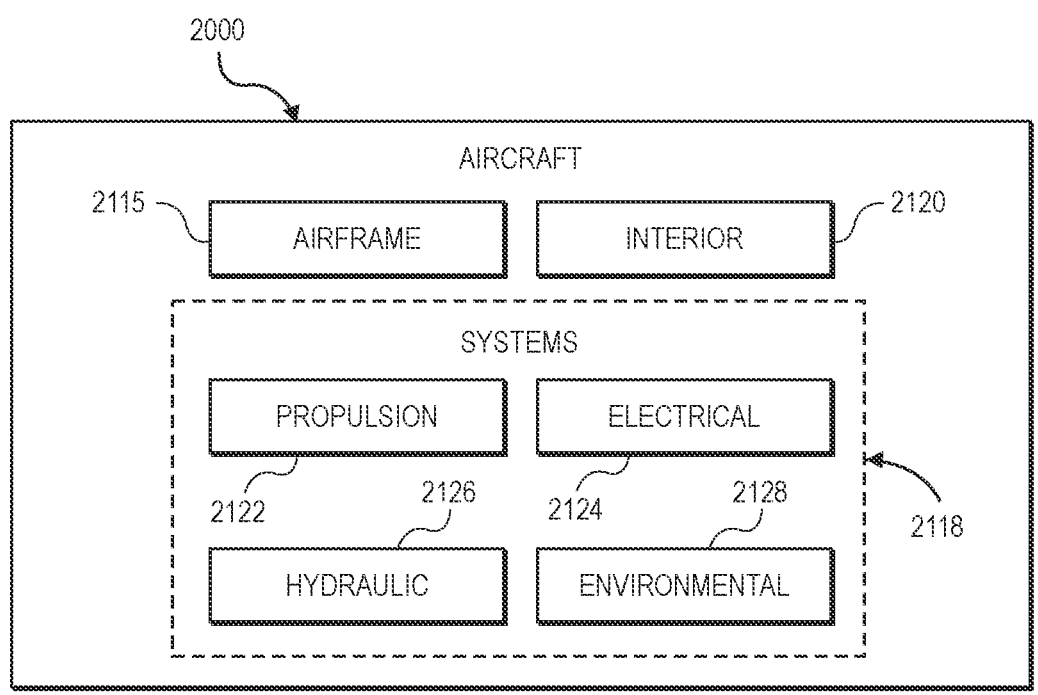
FIG. 12 illustrates a block diagram of an aircraft.

Implementations of the present disclosure may find use in a variety of potential applications, particularly in the transportation industry, including for example, aerospace, marine, automotive applications, and other application where reinforced sandwich panel are desired. Thus, referring now to FIGS. 11 and 12, implementations of the disclosure may be used in the context of an aircraft manufacturing and service method 1000 as shown in FIG. 11 and an aircraft 2000 as shown in FIG. 12. During pre-production, exemplary method 1000 may include specification and design 1102 of the aircraft 2000 and material procurement 1104. During production process 1106 (e.g., component and/or subassembly manufacturing) and system integration 1108 of the aircraft 2000 takes place. Thereafter, the aircraft 2000 may go through certification and delivery 1110 in order to be placed in service 1112. While in service by a customer, the aircraft 2000 is scheduled for routine maintenance and service 1114, which may also include modification, reconfiguration, refurbishment, and so on.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 2000 produced by exemplary method 1000 may include an airframe 2115 with a plurality of systems 2118 and an interior 2120. Examples of systems 2118 include one or more of a propulsion system 2122, an electrical system 2124, a hydraulic system 2126, and an environmental system 2128. Any number of other systems may be included. Although an aerospace example is shown, the principles of the disclosure may be applied to other industries, such as the marine and automotive industries.

Systems and methods exemplified herein may be employed during any one or more of the stages of the aircraft manufacturing and service method 1000. For example, components or subassemblies corresponding to production process 1106 may be fabricated or manufactured in a manner similar to components or subassemblies produced while the aircraft 2000 is in service. Also, one or more apparatus examples, method examples, or a combination thereof may be utilized during the production process 1106 and the 1108, for example, by substantially expediting assembly of or reducing the cost of an aircraft 2000. Similarly, one or more of apparatus examples, method examples, or a combination thereof may be utilized while the aircraft 2000 is in service, for example and without limitation, to maintenance and service 1114.

While FIGS. 11 and 12 describe the disclosure with respect to aircraft and aircraft manufacturing and servicing for illustration purposes, the present disclosure is not limited thereto. The systems and methods of the present disclosure may also be used for spacecraft, satellites, submarines, surface ships, automobiles, tanks, trucks, power plants, and any other suitable type of objects.

The present disclosure has been described with reference to exemplary implementations. Although a few implementations have been shown and described, it will be appreciated by those skilled in the art that changes can be made in these implementations without departing from the principles and spirit of preceding detailed description. It is intended that the present disclosure be construed as including all such modifications and alterations insofar as they come within the scope of the appended claims or the equivalents thereof.

What is claimed is:

1. A reinforced sandwich panel, comprising:
   two skin panels;
   a foam core disposed between the two skin panels;
   an expandable framework in an expanded state separating the two skin panels a predetermined distance and defining a fillable cavity in full fluid communication between the two skin panels; and
   a flexible film, wherein the foam core is encapsulated by the flexible film, and wherein the flexible film bonds the foam core to at least one of the skin panels or the expandable framework, wherein the encapsulated foam core is disposed within the fillable cavity and wherein the expandable framework acts as a skeleton for the encapsulated foam core,
wherein the encapsulated foam core fills substantially all of the fillable cavity, and
wherein the expandable framework is configured to resiliently expand from a collapsed state to the expanded state, and wherein the expandable framework is biased toward the expanded state such that reinforced sandwich panel expands to the expanded state solely due to a resilient force of the expandable framework, wherein the expandable framework comprises a plurality of interconnected and expandable struts configured to expand from the collapsed state to the expanded state, and wherein the plurality of interconnected and expandable struts are configured to lock in at least one of the collapsed state and the expanded state.

2. The reinforced sandwich panel of claim 1, further comprising one or more adhesive layers, wherein the one or more adhesive layers bond at least one of the encapsulated foam core and the expandable framework to the two skin panels.

3. The reinforced sandwich panel of claim 1, wherein the encapsulated foam core comprises one or more layers of expandable material and one or more additional layers, and wherein the one or more additional layers comprise at least one of reinforcing fibers or adhesive layers.

4. The reinforced sandwich panel of claim 1, wherein the expandable framework is bonded to the two skin panels.

5. The reinforced sandwich panel of claim 1, wherein the expandable framework comprises one or more of a metal, a ceramic, a paper or fiber product, a thermoplastic material, a thermoset material, or combinations thereof.

6. The reinforced sandwich panel of claim 1, wherein the expandable framework improves a thermal or electrical conductivity of at least one of the encapsulated foam core or the reinforced sandwich panel.

7. A reinforced multiple-core sandwich panel, comprising:
two or more skin panels; and
two or more cores disposed between the two or more skin panels;
wherein at least one of the two or more cores comprises a foam core, a flexible film, and an expandable framework in an expanded state between two of the two or more skin panels,
wherein the foam core is encapsulated by the flexible film, and wherein the flexible film bonds the encapsulated foam core to at least one of the skin panels or the expandable framework,
wherein the encapsulated foam core is disposed within a fillable cavity in full fluid communication defined by the expandable framework in an expanded state between the two of the two or more skin panels,
wherein the expandable framework separates the two of the two or more skin panels a predetermined distance, and acts as a skeleton for the encapsulated foam core, and
wherein the expandable framework is configured to resiliently expand from a collapsed state to the expanded state, and wherein the expandable framework is biased toward the expanded state such that reinforced sandwich panel expands to the expanded state solely due to a resilient force of the expandable framework, wherein the expandable framework comprises a plurality of interconnected and expandable struts configured to expand from the collapsed state to the expanded state, and wherein the plurality of interconnected and expandable struts are configured to lock in at least one of the collapsed state and the expanded state.

8. The reinforced multiple-core sandwich panel of claim 7, further comprising: one or more septum disposed between the two or more cores.

9. The reinforced multiple-core sandwich panel of claim 8, further comprising: one or more adhesive layers disposed between the two or more cores and the two or more skin panels or the one or more septum, wherein the one or more adhesive layers bond at least one of the two or more cores to the two or more skin panels or the one or more septum.

10. The reinforced multiple-core sandwich panel of claim 7, wherein at least one of the two or more cores has a different functional characteristic than the rest of two or more cores.

11. A method for making a reinforced sandwich panel, comprising:
placing a reinforced sandwich panel framework;
expanding the reinforced sandwich panel framework;
placing a foam core within the reinforced sandwich panel framework; and
expanding the foam core,
wherein the reinforced sandwich panel framework comprises:
two skin panels, and
an expandable framework disposed between the two skin panels, and
wherein the expandable framework has a first height separating the skin panels when the expandable framework is in a collapsed state and a second height separating the skin panels when the expandable framework is in an expanded state, and wherein the second height is greater than the first height,
wherein the expandable framework defines a fillable cavity in full fluid communication in the expanded state between the skin panels, wherein the expandable framework comprises a plurality of interconnected and expandable struts configured to expand from the collapsed state to the expanded state, and wherein the plurality of interconnected and expandable struts are configured to lock in at least one of the collapsed state and the expanded state,
wherein the foam core is encapsulated by a flexible film, and the flexible film bonds the foam core to at least one of the skin panels or the expandable framework,
wherein the encapsulated foam core substantially fills the fillable cavity, and
wherein the expandable framework acts as a skeleton for the encapsulated foam core in the expanded state, and
wherein expanding the reinforced sandwich panel framework comprises solely using the expandable framework to resiliently expand the reinforced sandwich panel framework to the expanded state.

12. The method of claim 11, further comprising at least one of:
consolidating a reinforced sandwich panel;
trimming the reinforced sandwich panel;
sealing the reinforced sandwich panel; and
removing the reinforced sandwich panel.

13. The method of claim 12, wherein consolidating the reinforced sandwich panel comprises placing a vacuum bag around the reinforced sandwich panel and applying a vacuum to the reinforced sandwich panel.

14. The method of claim 12, wherein consolidating the reinforced sandwich panel comprises applying one of a curing pressure or temperature to the reinforced sandwich panel and fusion bonding at least one of the frameworks or the encapsulated foam core to at least one of the skin panels.

15. The method of claim 11, wherein the expandable framework locks in the expanded state to maintain a predetermined distance between skin panels of the reinforced sandwich panel framework.

16. The method of claim 11, wherein expanding the reinforced sandwich panel framework comprises expanding the encapsulated foam core to expand the reinforced sandwich panel framework to an expanded state,
   wherein an expandable material of the encapsulated foam core expands at room temperature, and
   wherein the expandable framework generates a static field capable of attracting the expandable material of the encapsulated foam core.

* * * * *